US010706691B2

(12) United States Patent
Hecker

(10) Patent No.: US 10,706,691 B2
(45) Date of Patent: Jul. 7, 2020

(54) SWITCHING DUAL VIRTUAL SELF-SERVICE TERMINALS (SSTS)

(71) Applicant: NCR Corporation, Duluth, GA (US)

(72) Inventor: Weston Lee Hecker, Bismarck, ND (US)

(73) Assignee: NCR Corporation, Atlanta, GA (US)

( * ) Notice: Subject to any disclaimer, the term of this patent is extended or adjusted under 35 U.S.C. 154(b) by 185 days.

(21) Appl. No.: 15/993,440

(22) Filed: May 30, 2018

(65) Prior Publication Data

US 2019/0371132 A1    Dec. 5, 2019

(51) Int. Cl.
*G06F 9/455*    (2018.01)
*G07F 19/00*    (2006.01)
*G06F 9/46*    (2006.01)

(52) U.S. Cl.
CPC ........ *G07F 19/206* (2013.01); *G06F 9/45558* (2013.01); *G06F 9/466* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

2019/0371132 A1* 12/2019 Hecker ................. G06F 9/466

* cited by examiner

*Primary Examiner* — Gregory A Kessler
(74) *Attorney, Agent, or Firm* — Schwegman, Lundberg & Woessner

(57) ABSTRACT

Dual Self-Service Terminal (SST) Virtual Machines (VMs) are provided. A VM is selected for processing a transaction on the SST as an active core. The active core is dynamically switched back and forth between a first VM and a second VM on a per-transaction basis. Upon failure, a last-successful image for the failing VM is reloaded for the failing VM when the failing VM is scheduled to be cycled back to the active core.

10 Claims, 4 Drawing Sheets

SWITCHING DUAL VIRTUAL SELF-SERVICE TERMINALS (SSTS)

BACKGROUND

Security and resilience of Automated Teller Machines (ATMs—one type of a Self-Service Terminal) to attacks and common issues can lead to breaches in the security integrity of: the ATMs, the network, and user account information. Nefarious individuals and even well-funded and equipped state actors are continuously trying to breach and attack ATMs, users' account information, and financial systems interfaced to the ATMs.

Moreover, when an ATM is offline, the ATM is unavailable for customer transactions. This results in lost revenues for the financial institutions and companies that provide the ATMs. Much worse, is that a customer is unlikely to return to an ATM if that ATM is offline more than a few times when the customer is in need of the ATM. ATMs often experiences glitches where the state of the ATM can become corrupt resulting in failures that can sometimes be fixed with a simple reboot of the ATM, or which may be more serious and require a technician to properly resolve.

Also, when ATM hardware and/or software resources are patched or upgraded, the discovery of a corrupted or malfunctioning hardware and/or software resource may not be immediately discoverable and may only surface after some unexpected resources are processed in a predefined order after the changes are made to the ATM. In fact, the ATM failures may appear to have no real correlation that can be detected by technicians. When more than a few failures occur in this scenario, the ATM changes are usually backed out to prevent future failures, even when the changes were recommended by a hardware and software vendor for security or for proper vendor support.

Suffice it to say, the security and high-availability of ATMs are of utmost significance to the financial industry. However, because ATMs are processing devices and state-based machines, their memories, storages, configuration settings, and resources can, over time, be corrupted and not function properly or as intended, resulting in ATM unavailability for customer transactions and potentially exposing the ATM to security breaches.

SUMMARY

In various embodiments, methods and a SST having switching dual SSTs' cores are presented.

According to an embodiment, a method for switching dual SSTs' cores is presented. Specifically, and in one embodiment, a completion of a transaction that was processed by a first VM of a SST is detected. A second VM is switched to as an active core for processing a next transaction from the SST. The first VM is imaged on storage of the SST when the transaction was successfully processed by the first VM.

DETAILED DESCRIPTION

Figure 1:
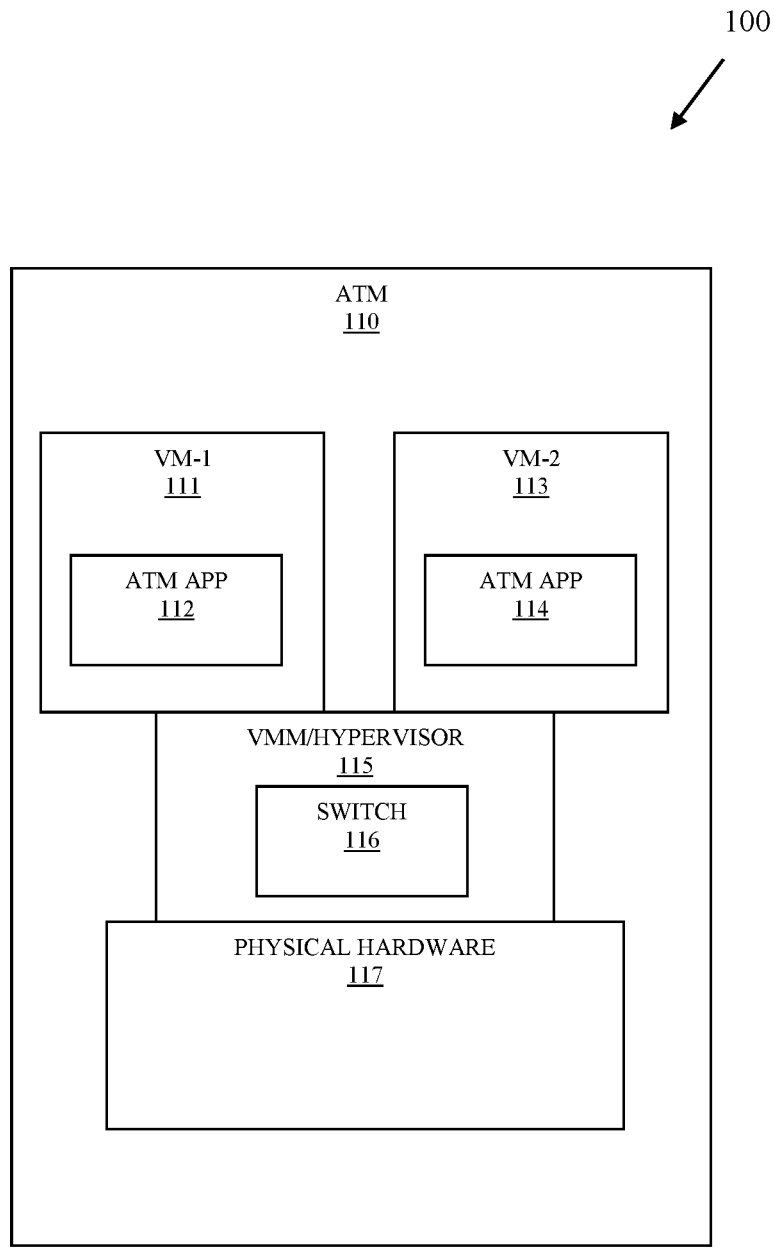
FIG. 1 is a diagram of a system for switching dual SSTs' cores, according to an example embodiment.

FIG. 1 is a diagram of a system 100 for switching dual SSTs' cores, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of switching dual SSTs' cores, presented herein and below.

The system 100 includes a single ATM 110 (one type of SST). The ATM 110 including: two independent Virtual Machines 111 (VM-1) and 113 (VM-2), each VM 111 and 113 include its own independent ATM application (app) 112 and 114, respectively. The ATM 110 further including a Virtual Machine Monitor (VMM) or hypervisor 115 having a switch 116. The ATM 110 also including physical computing hardware and peripheral device hardware (hereinafter just "hardware 117"), such as hardware processors, volatile memory, non-volatile memory, storage, peripheral display, peripheral scanner, peripheral card reader, peripheral currency safe/cassette, peripheral encrypted Personal Identification Number (PIN) pad, and other peripheral devices.

The VMM/hypervisor 115 includes switching software instructions (hereinafter just "switch 116") that are executed on the physical hardware 117. The switch 116 monitors the ATM apps 112 and 114 to receive a notification of when a transaction is completed on each of the respective VMs 111 and 113. This can also be done through an agent deployed and ran in each of the VMs 111 and 113.

For any given transaction that is currently being processed on the ATM 110, just one VM 111 or 113 is actively loaded into volatile memory or available from a predefined partition of volatile memory (a type of physical hardware 117) and executed as a ATM core by the physical processors (another type of physical hardware 117). Each VM 111 and 113 represents its own independent ATM processing environment (core). Two images are maintained for the cores by the VMM/hypervisor 115.

After a transaction completes on an active core (111 or 113), the switch 116 forces the previous active core (111 or 113) to be re-imaged based on its current state and the switch 116 loads the other non-active core (111 or 113) into volatile memory for execution by the processors or makes it that core (111 or 113) available from its volatile memory partition.

If a transaction fails on an active core 111 or 113, the switch 116 immediately loads the other core 111 or 113 into volatile memory for execution by the processors or switches to that core's volatile memory partition and/or processors. This ensure high-availability (HA) for the ATM with one good active core 111 and 113 always being available for execution on the ATM 110. Moreover, if an active core 111 or 113 fails, then the last successful image before the failure is used when that core 111 or 113 is loaded as an active core 111 or 113 for a next cycling between the cores 111 and 113. That is, a failed running instance of a core 111 or 113 is not reimaged rather its last successful saved image is used when the switch 116 cycles back to the next core 111 or 113. Thus, at all times the ATM 110 has at least two known cores 111 and 113 that the switch 116 can load, ensuring that the ATM 110 has HA for customer transaction processing by the ATM apps 112 and 114.

During the cycling of re-imaging and core swapping, should one core image become unstable, the switch 116 uses the remaining stable core 111 or 113 until the unstable core image can be corrected.

By continuously reimaging the cores 111 and 113 and swapping in an out the active cores 111 and 113, any attempted installation of viruses and/or malware do not have a chance to root (take control) and do damage or cause security concerns on the ATM 110.

In an embodiment, both VMs (cores) 111 and 113 are loaded and being executed simultaneously on the hardware 117 in different volatile memory partitions and by different sets of processors; however, the switch 116 ensures that just one memory partition for the active core 111 or 113 is available for customer transactions. As soon as a transaction completes successfully by the active core's ATM app 111 or 113, the switch 116 immediately switches the active core 111 or 113 to the other memory partition for the next active core 111 or 113 and begins to image (snapshot) the previous active core 111 or 113 utilizing a different set of processors. This provides a seamless and near instantaneously availability for customer transaction processing on the ATM 110 with no discernable transition time.

In an embodiment, the hardware 117 includes Intel® I5 and/or I3 processors, which allows for redundant VMs actively processing on a same device (ATM 110).

In an embodiment, the switch 116 writes an identifier for the last active core 111 or 113 into an non-volatile memory location or on a storage location, such that should the switch detect a boot cycle for the ATM 110, the VMM/hypervisor 115 can load the next active core 111 or 113. This ensures that if a corrupt core 111 or 113 fails and forces a boot cycle that the switch 116 can move to the non-corrupted core 111 or 113 and acquire a known working core image for the corrupt core 111 or 113 when it is cycled back as the active core 111 or 113.

As used herein and below, the terms VM and core 111 and 113 may be used interchangeably and synonymously with one another. A VM is a software emulation of a computer system (including the operating system (OS) and peripheral drivers) that is executed on the underlying physical hardware 117 of the host ATM 110 (SST 110).

In an embodiment, the system 100 is provided with a SST that is a kiosk, self-service grocery checkout, or a Point-Of-Sale (POS) terminal operated by an assistant to assist with customer transactions of a customer.

The system 110 maintains dual cores 111 and 113 for the ATM 110 and actively cycles each core 111 and 113 as an active core 111 or 113 that is available for customer transaction processing on the ATM 110. Each cycle maintains a previous processing state of the core 111 or 113 that is being moved to a deactivated state by imaging the swapped out core 111 or 113. However, the imaging is not done if a swapped out core 111 or 113 is detected as having a failure during transaction processing (such as a forced boot or transaction error identified with the ATM app 112 or 114).

The dual cores 111 and 113 provide a mechanism to ensure HA of the ATM 110 and increase device security by preventing malware or viruses from rooting or spreading.

These and other embodiments will now be discussed with reference to the FIGS. 2-4.

Figure 2:
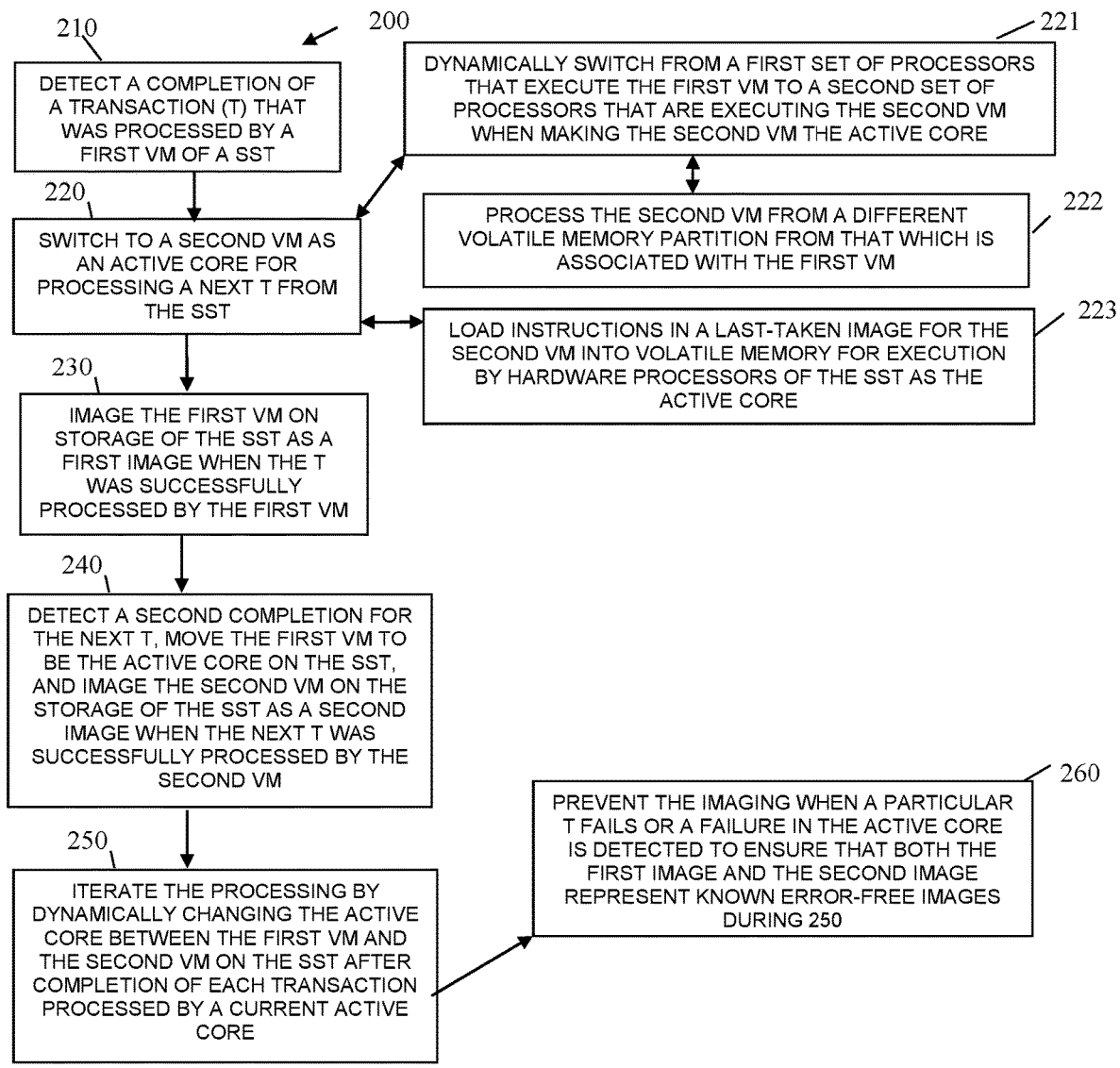
FIG. 2 is a diagram of a method for switching dual SSTs' cores, according to an example embodiment.

FIG. 2 is a diagram of a method 200 for switching dual SSTs' cores, according to an example embodiment. The software module(s) that implements the method 200 is referred to as a "dual core switcher." The dual core switcher is implemented as executable instructions programmed and residing within memory and/or a non-transitory computer-readable (processor-readable) storage medium and executed by one or more hardware processors of a device. The hardware processor(s) of the device that executes the dual core switcher are specifically configured and programmed to process the dual core switcher. The dual core switcher may or may not have access to one or more network connections during its processing. The network connections can be wired, wireless, or a combination of wired and wireless.

In an embodiment, the device that executes the dual core switcher lacks network connectivity.

In an embodiment, the device that executes the dual core switcher is the ATM 110. In an embodiment, the device 110 is one of: a SST, a kiosk, and a POS terminal.

In an embodiment, the dual core switcher is all or some combination of the VMM/Hypervisor 115 and/or the switch 116.

At 210, the dual core switcher detects completion of a transaction that was processed by a first VM of a SST (SST processors executing the dual core switcher). This can be done in a number of manners such as an agent that processes within the first VM that monitors transactions processing within the first VM. In an embodiment, this is done through an ATM application 112. The notice to the dual core switcher can be a simple as a bit being set within a defined memory location or a bit being written to a defined storage location that is shared between the first VM and the dual core switcher. Other techniques can be done as well, such that the dual core switcher receives notice or detects an event that is generated from the first VM that indicates a transaction has completed processing within the first VM.

At 220, the dual core switcher switches to a second VM as an active core processing a next transaction from the SST. That is, the active core for the SST was the first VM at 210 but after transaction processing the active core is dynamically switch to the second VM.

In an embodiment, at 221, the dual core switcher dynamically switches from a first set of processors that execute the first VM to a second set of processors that are executing the second VM when making the second VM the active core. That is, both the first VM and the second VM are actively being processed on the hardware processors of the SST, but the second VM processors are idle until the dual core switcher sets the second VM to the active core, at which time the first VM processors are idled. This provides for quick and efficient switching between the first and second VMs.

In an embodiment of 221 and at 222, the dual core switcher processes the second VM from a different volatile memory partition from that which is associated with the first VM. The first partition is managed by the first set of processors while a second and different volatile memory partition is associated with the second VM.

In an embodiment, at 223, the dual core switcher loads instructions in a last-taken image for the second VM into volatile memory for execution by hardware processors of the SST as the active core representing the second VM. This can be particularly useful when the second VM had failed to process its last transaction while it was previously set to the active core, such that only the last-taken image of the second VM is loaded when the second VM becomes the active core.

At 230, the dual core switcher images the first VM on storage of the SST as a first image when the transaction was successfully processed by the first VM.

The processing at 220 and 230 can occur concurrently on a parallel processing architecture of the SST utilizing multiple processors.

In an embodiment, at 240, the dual core switcher detects a second completion for the next transaction, moves the first VM to be the active core on the SST, and images the second VM on the storage of the SST as a second image when the next transaction was successfully processed by the second VM.

In an embodiment of 240 and at 250, the dual core switcher iterates the processing by dynamically changing the active core between the first VM and the second VM on the SST after completion of each transaction processed by a current active core.

In an embodiment of 250 and at 260, the dual core switcher prevents the imaging when a particular transaction fails or a failure in the active core is detected to ensure that both the first image and the second image represent known error-free images during the processing at 250.

Figure 3:
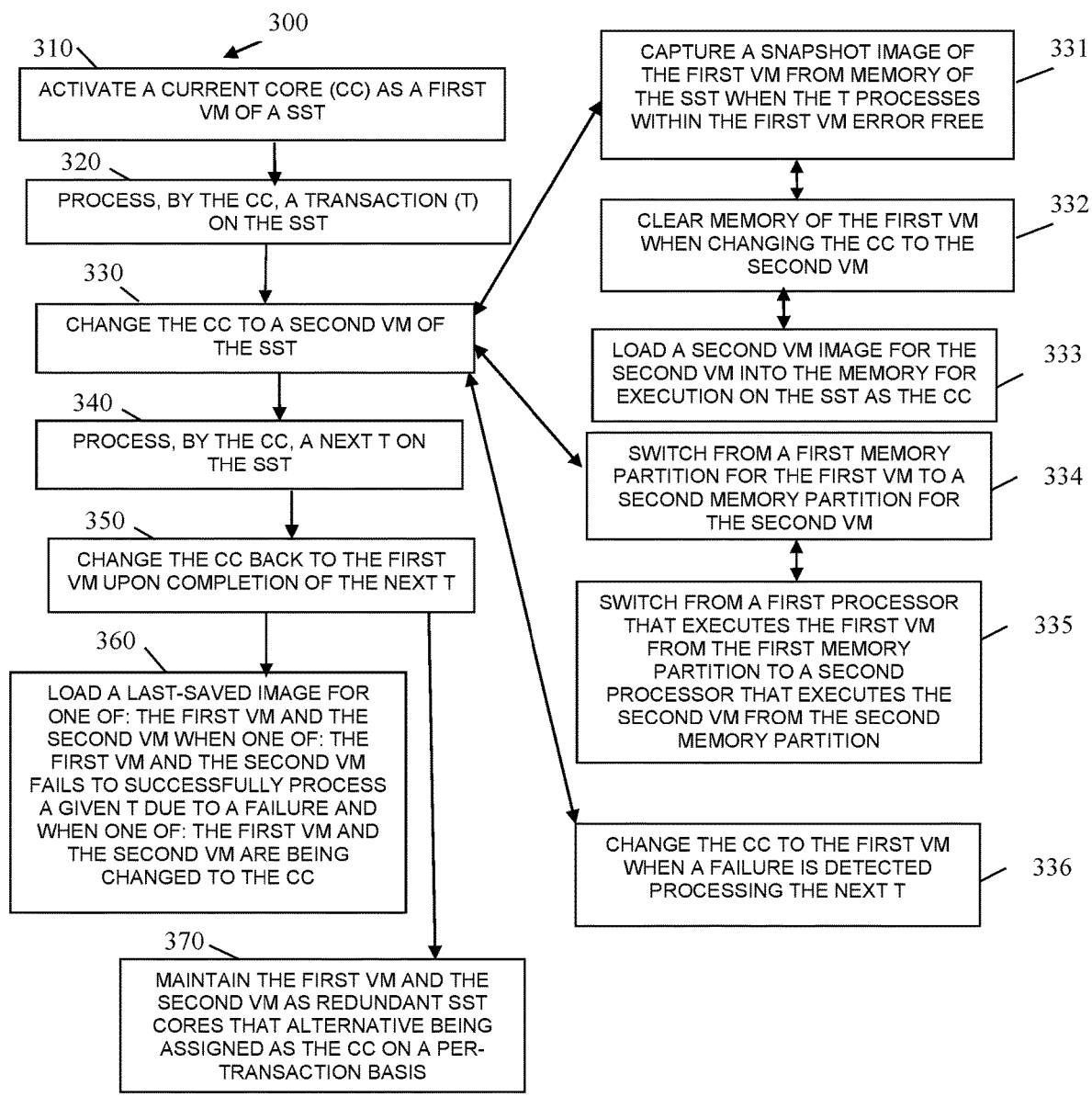
FIG. 3 is a diagram of another method for switching dual SSTs' cores, according to an example embodiment.

FIG. 3 is a diagram of another method 300 for switching dual SSTs' cores, according to an example embodiment. The software module(s) that implements the method 300 is referred to as a "dual machine hypervisor." The dual machine hypervisor is implemented as executable instructions programmed and residing within memory and/or a non-transitory computer-readable (processor-readable) storage medium and executed by one or more hardware processors of a device. The hardware processors that execute the dual machine hypervisor are specifically configured and programmed to process the dual machine hypervisor. The dual machine hypervisor may or may not have access to one or more network connections during its processing. The network connections can be wired, wireless, or a combination of wired and wireless.

In an embodiment, the device that executes the dual machine hypervisor lacks network connectivity.

In an embodiment, the device that executes the dual machine hypervisor is the ATM 110. In an embodiment, the device 110 is one of: a SST, a kiosk, and a POS terminal.

In an embodiment, the dual machine hypervisor is all or some combination of the VMM/hypervisor 115, the switch 116, and/or the method 200.

The dual machine hypervisor presents another and in some ways enhanced processing perspective of the method 200.

At 310, the dual machine hypervisor activates a current core as a first VM of a SST.

At 320, the current core processes a transaction on the hardware processors of the SST within the first VM.

At 330, the dual machine hypervisor changes the current core to a second VM of the SST.

In an embodiment, at 331, the dual machine hypervisor captures a snapshot image of the first VM from memory of the SST when the transaction processes within the first VM error-free.

In an embodiment of 331 and at 332, the dual machine hypervisor clears memory of the first VM when changing the current core to the second VM.

In an embodiment of 332 and at 333, the dual machine hypervisor loads a second VM image for the second VM into memory for execution on the hardware processors of the SST as the current core.

In an embodiment, at 334, the dual machine hypervisor switches from a first memory partition for the first VM to a second memory partition for the second VM. The first and second memory partitions are independent and separately managed within the SST as independent processing environments for the first and second VMs.

In an embodiment of 334 and at 335, the dual machine hypervisor switches from a first processor that executes the first VM from the first memory partition to a second processor that executes the second VM from the second memory partition.

In an embodiment, at 336, the dual machine hypervisor changes the current core to the first VM when a failure is detected processing the next transaction within the second VM. This provides failover processing and high availability of transaction processing on the SST.

At 340, the current core (set to the second VM at 340) processes the next transaction on the SST.

In an embodiment, at 350, the dual machine hypervisor changes the current core back to the first VM upon completion of the next transaction.

In an embodiment of 350 and at 360, the dual machine hypervisor loads a last-saved image for one of: the first VM and the second VM when one of: the first VM and the second VM fails to successfully process a given transaction due to failure and when one of: the first VM and the second VM are being changed to the current core.

In an embodiment, at 370, the dual machine hypervisor maintains the first VM and the second VM as redundant SST cores that alternate being assigned as the current core on a per-transaction basis.

Figure 4:
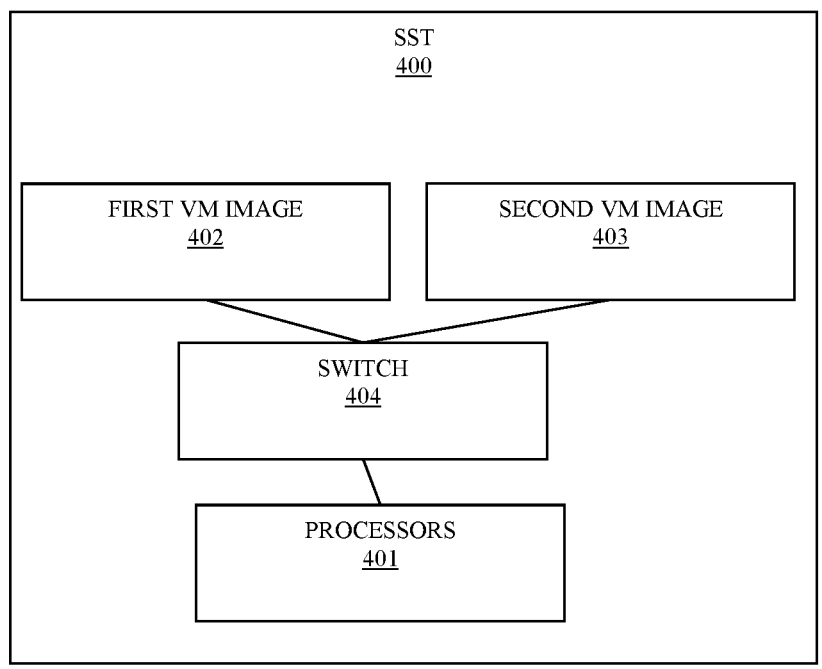
FIG. 4 is a diagram of a SST with switching dual SST cores, according to an example embodiment.

FIG. 4 is a diagram of a SST 400 dual machine hypervisor, according to an example embodiment. The SST 400 includes a variety of hardware components and software components. The software components of the SST 400 are programmed and reside within memory and/or a non-transitory computer-readable medium and execute on one or more hardware processors of the SST 400. The SST 400 may or may not communicate over one or more networks, which can be wired, wireless, or a combination of wired and wireless.

In an embodiment, the SST 400 lacks any network connectivity.

In an embodiment, the SST 400 implements, inter alia, the processing described above with the FIGS. 1-3.

The SST 400 includes a plurality of hardware processors 401, a first VM image 402, a second VM image 403, and a switch 404.

In an embodiment, the SST 400 is the ATM 110.

In an embodiment, the SST 400 is a kiosk or a POS terminal.

The processors 401 are configured to execute the switch 404, the first VM image 402 as a first VM, and the second VM image 403 as a second VM on the SST 400.

The switch 404 is configured to: i) set an active core on the SST 400 for transaction processing by alternating between the first VM and the second VM on a per-transaction basis, ii) capture snapshots representing the first VM image 402 and the second VM image 403 after the first VM and the second VM process assigned transactions successfully, and iii) re-load particular snapshots when one of: the first VM and the second VM fails during processing of their assigned transactions.

In an embodiment, the switch 404 is further configured, in i), to clear memory of the SST 400 when changing the active core between the first VM and the second VM.

In an embodiment, the switch is all of or some combination of the VM/hypervisor 115, the switch 116, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting a completion of a transaction that was processed by a first Virtual Machine (VM) of a Self-Service Terminal (SST);
   switching to a second VM as an active core for processing a next transaction from the SST; and
   imaging the first VM on storage of the SST as a first image when the transaction was successfully processed by the first VM.

2. The method of claim 1 further comprising, detecting a second completion for the next transaction, moving the first VM to be the active core on the SST, and imaging the second VM on the storage of the SST as a second image when the next transaction was successfully processed by the second VM.

3. The method of claim 2 further comprising, iterating the method by changing the active core between the first VM and the second VM on the SST after completion of each transaction processed by a current active core.

4. The method of claim 3 further comprising, preventing the imaging when a particular transaction fails or a failure in the active core is detected ensuring that both the first image and the second image represent known error-free images during the iterating.

5. The method of claim 1, wherein switching further includes dynamically switching from a first set of processors that execute the first VM to a second set of processors that are executing the second VM when making the second VM the active core.

6. The method of claim 5, wherein dynamically switching further includes processing the second VM from a different volatile memory partition from that which is associated with the first VM.

7. The method of claim 1, wherein switching further includes loading instructions in a last-taken image for the second VM into volatile memory for execution by hardware processors of the SST as the active core.

8. A Self-Service Terminal (SST), comprising:
   processors configured to load into memory and execute a first virtual machine (VM) image for a first VM, a second VM image for a second VM, and a switch;
   the first VM image;
   the second VM image; and
   the switch;
   wherein the switch is configured to: i) set an active core on the SST for transaction processing by alternating between the first VM and the second VM on a per-transaction basis, ii) capture snapshots representing the first VM image and the second VM image after the first VM and the second VM process assigned transactions successfully, and iii) re-load particular snapshots when one of: the first VM and the second VM fails during processing of their assigned transactions.

9. The SST of claim 8, wherein the SST is an Automated Teller Machine (ATM).

10. The SST of claim 8, wherein the switch is further configured, in i), to clear memory of the SST when changing the active core between the first VM and the second VM.

* * * * *